INVENTORS
WERNER MOHR
WERNER SCHLAPP
BY Krafft & Wells
ATTORNEYS

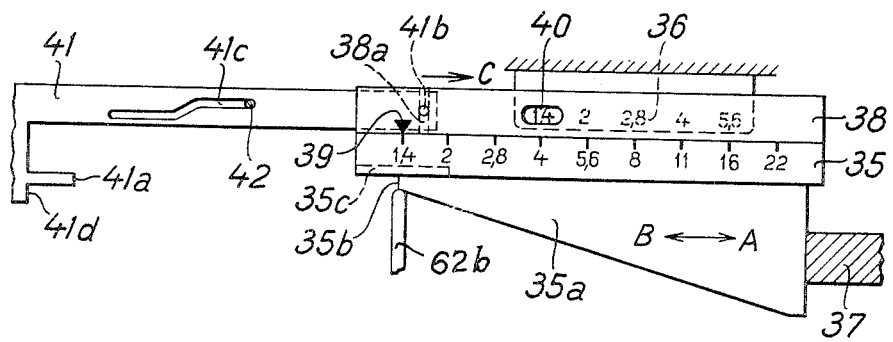
*Fig. 8a*
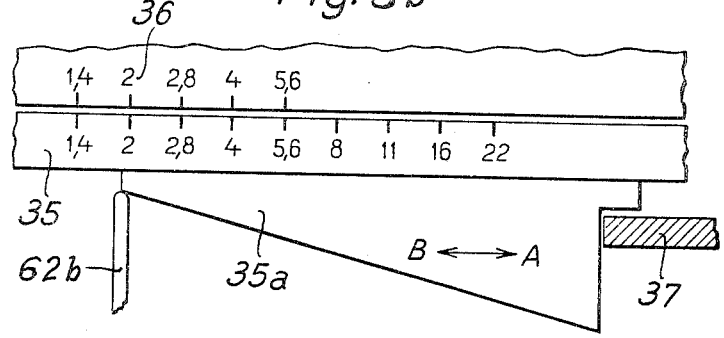
*Fig. 8b*
*Fig. 8c*
| 1,4 | 2 | 2,8 | 4 | 5,6 | 8 | 11 | 16 |    |
|     | 2 | 2,8 | 4 | 5,6 | 8 | 11 | 16 |    |
|     |   | 2,8 | 4 | 5,6 | 8 | 11 | 16 | 22 |
|     |   |     | 4 | 5,6 | 8 | 11 | 16 | 22 |
|     |   |     |   | 5,6 | 8 | 11 | 16 | 22 |

3,489,071
SINGLE OBJECTIVE REFLEX CAMERA HAVING AN IMPROVED BELLOWS
Werner Mohr, Wetzlar, and Werner Schlapp, Asslar, Wetzlar, Germany, assignors to Ernst Leitz, Wetzlar, Germany
Filed Nov. 9, 1966, Ser. No. 593,099
Claims priority, application Germany, Nov. 20, 1965, L 52,194
Int. Cl. G03b 9/07
U.S. Cl. 95—64  5 Claims

ABSTRACT OF THE DISCLOSURE

The present invention relates to a single lens reflex camera of the interchangeable objective type, with preselecting diaphragm and having a bellows.

In particular embodiments of the invention, single lens reflex cameras having an exposure meter that is coupled to adjusting devices for exposure times and diaphragm opening are provided with a bellows apparatus having an objective standard containing a diaphragm adjuster that is accessible from the outside that can be moved against resilient means into an objective opening position and locked in such position by a locking means which is disengageable by means of a double wire cable release or manually immediately before shutter actuation, and a mechanism at the end of the bellows apparatus adjacent the camera and coupled to the exposure meter, which mechanism serves to adjust the follow-up pointer of the exposure meter device in the same manner as does the diaphragm preselecting ring in the lens when said lens is directly mounted on the camera body. The mechanism consists essentially of a ring-shaped diaphragm number carrier provided with a cam extending in the direction of the camera body. The cam acts upon a cam follower which, in turn, transmits the cam motion to the follow-up pointer of the measuring device. Since this mechanism serves to simulate to the exposure meter device a setting of the diaphragm preselecting ring, it will be referred to throughout the specification as to the simulating mechanism.

CROSS-REFERENCES TO RELATED APPLICATIONS

Applicants claim priority under 35 U.S.C. 119 for application L 52,194, filed Nov. 20, 1965, in the Federal Republic of Germany.

The disclosure of the copending application of Heinrich Broschke, Werner Holle and Willi Wiesner, filed Oct. 5, 1966 having Ser. No. 594,648, now Patent No. 3,427,946, and assigned to the assignee of the present invention is incorporated herein.

BACKGROUND OF THE INVENTION

It has been known to provide the lenses of single lens reflex cameras with preselecting diaphragm structure in order to enable the user of such cameras to observe the object through the greatest possible aperture at maximum brightness of the viewing screen and to close down the diaphragm aperture only immediately prior to the shutter release.

To achieve this, a diaphragm preselecting ring is usually provided on the lens which is set to an aperture deemed appropriate in accordance with the released shutter speed and the light intensity of the object to be photographed. As is well known in the art, this preselecting ring comprises an abutment against which the movable diaphragm blade ring abuts under the influence of a tensioned spring after pressing the shutter release button but just prior to the actual shutter release.

If the camera is additionally provided with an exposure meter which, for instance, by way of a follow-up pointer is coupled to the shutter speed and diaphragm setting mechanism of the camera, it is further known to provide on the diaphragm preselecting ring a cam and a cam follower which usually is an integral part of the camera body. The cam follower may then interconnect the exposure meter and/or the follow-up pointer structure, so that by turning the preselecting ring the selected $f$-stop value is transmitted to the exposure meter structure.

Furthermore, it is known to retain the diaphragm during the view finding stage in a position corresponding to its widest opening and to this end to provide a locking mechanism which in a known manner is an integral part of the camera body. Said locking device cooperates with the movable diaphragm blade ring which is part of the lens and which is prevented from closing down unless the shutter release button is pressed.

In order to achieve an appropriate reproduction scale, especially when photographing smaller objects, it is known to insert between the camera body and the lens a bellows the length of which may be variable by a rack and pinion construction known per se. It is a disadvantage, however, that by inserting said bellows the interconnection between the cam and the cam follower, and also the interconnection between the movable diaphragm blade ring and the locking structure in the camera body is segregated. Hence, neither can the cam on the preselecting ring transmit the preselected $f$-stop value to the exposure meter structure, nor can the locking device retain the diaphragm in the position of its greatest aperture. Both devices are thus rendered ineffective.

It is well known to those skilled in this particular art that it is basically possible to measure the light intensity of the object to be photographed in two different ways, i.e., by way of a photosensitive element or resistor which receives its light through a separate opening in the camera body, or by way of a photosensitive element or resistor which receives its light through the picture taking lens. The latter method being known as the TTL (through the lens) method.

In a camera in which the photosensitive element receives its light through a separate opening in the camera body, it suffices to provide a single cam ring at the rear of the bellows. If, however, the photosensitive element receives its light through the picture taking lens, and since this picture taking lens is interchangeable for any one of a plurality of other picture taking lenses, which all may have different maximum aperture openings, these different openings must be taken into account while establishing the proper exposure time and $f$-stop value. The way in which this can be done is outlined in the assignee's copending application Ser. No. 594,684, now Patent No. 3,427,946, of the inventors Heinrich Broschke, Werner Holle, and Willi Wiesner, filed Oct. 5, 1966, in the U.S. Patent Office.

DESCRIPTION OF THE INVENTION

It is, therefore, an object of the invention to provide means on the bellows which re-interconnect the exposure meter structure in order to enable the user of the camera to semi-automatically establish the correct exposure time and f-stop value which latter must then be manually set on the objective diaphragm preselecting ring.

Another object of the invention is to provide means on on the bellows to take into account different degrees of aperture openings of the picture taking lenses used.

It is a further object of the invention to provide means on the bellows to retain the diaphragm blade ring in the position corresponding to its largest aperture, which means may be used to release said diaphragm blade ring prior to shutter release.

It is a further object of the invention to combine said means with the operating knob of the rack and pinion structure which moves the objective carrying standard of the bellows so that the user can more conveniently operate both structures without changing the grip of his hand.

Other objects and advantages of this invention will become apparent upon reference to the accompanying description when taken in conjunction with the following drawings, wherein:

FIGURE 1a is a detailed view of an arm extending from the movable diaphragm blade ring, as shown in FIGURE 1;

FIGURE 1b is a detailed view of the diaphragm presetting ring as shown in FIGURE 1;

FIGURES 8a, 8b, 8c are schematic developments of the simulated actuator for operation between the largest and smallest relative openings at the variable actuator.

Figure 1:
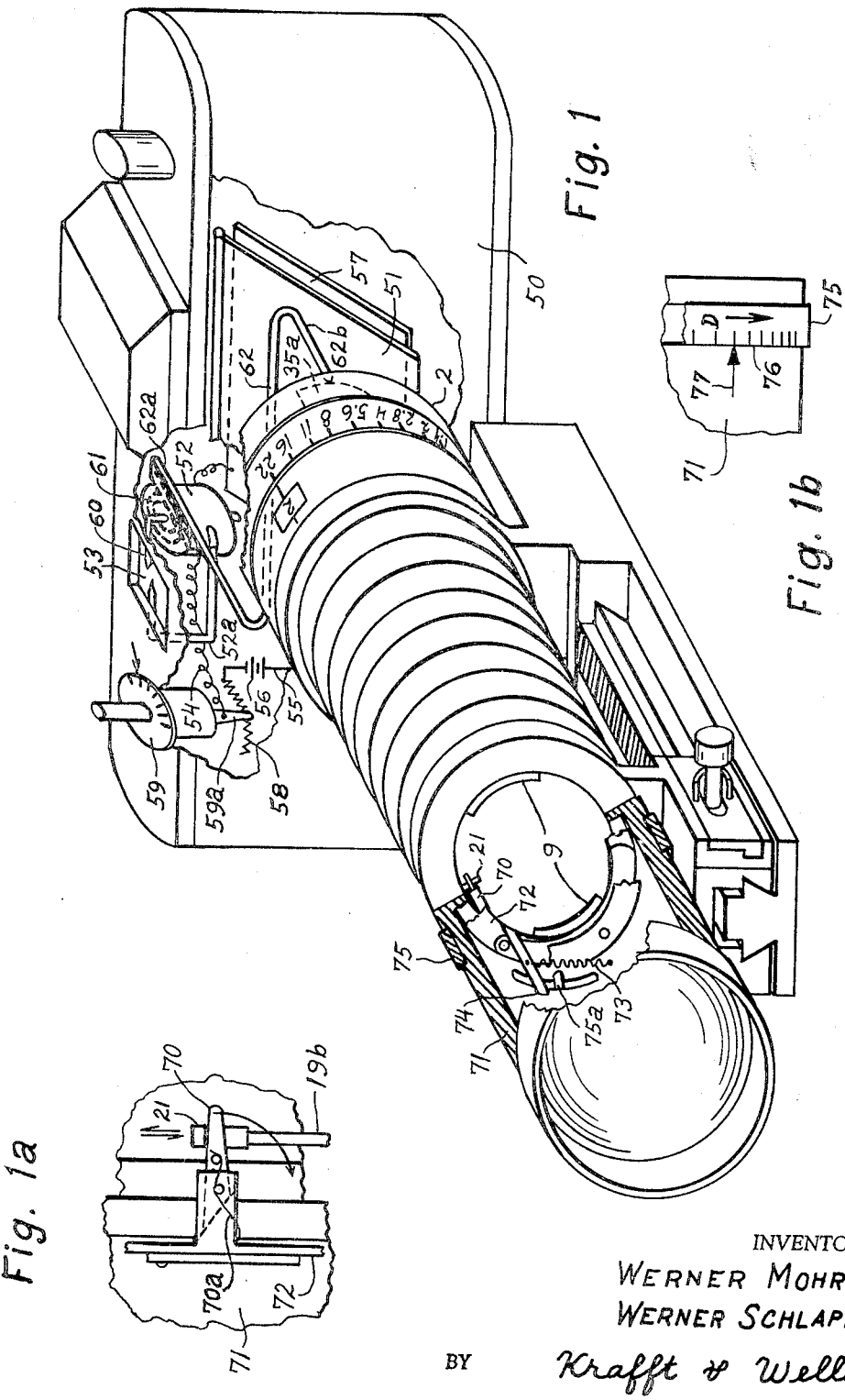
FIGURE 1 is a perspective view of a bellows with camera and picture taking lens attached to it, portions of the camera and the lens removed to show details of the structure.
Figure 2:
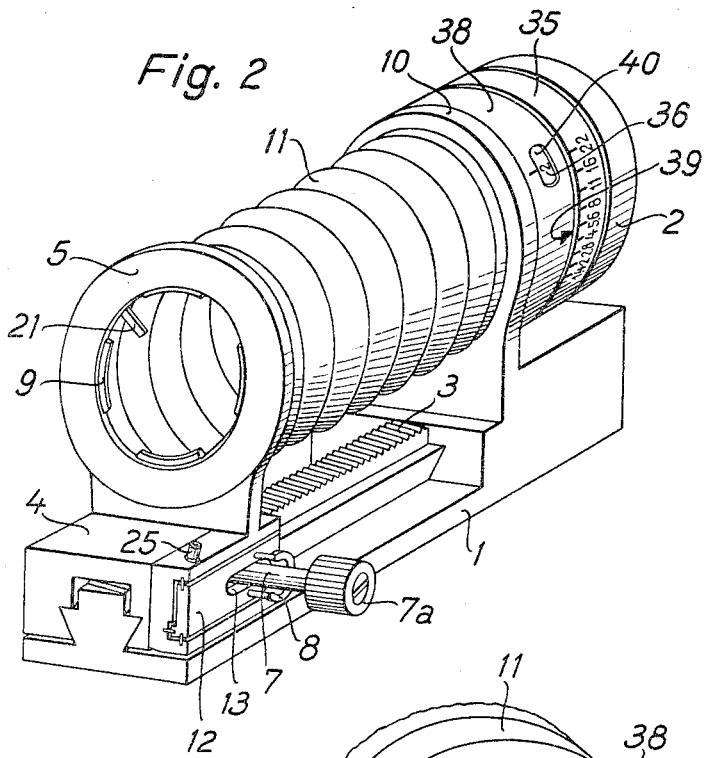
FIGURE 2 is a perspective view of the bellows apparatus alone.

As particularly shown in FIGURES 1 and 2, the bayonet mounting 2 of the bellows apparatus is attached to the camera body 50. The latter contains the reflecting mirror 51 as well as the rigidly mounted exposure meter 52. The pointer 52a of the exposure meter 52 is visible from the outside through a viewing window 53.

By a wire connection 54, 55, the exposure meter 52 is electrically in series connection with the battery 56, the photoelectric resistor 57 and the variable resistor 58. The photoelectric resistor 57 is attached to the back of the mirror 51, which for the purpose of transmitting the light to the photo-resistor 57, is of the semi-transparent type. The variable resistor 58 is operable and adjustable with the shutter speed setting dial 59, a part of which is formed as the feeler 59a which moves across the variable resistor 58 when ever the shutter speed setting dial 59 is adjusted, thus causing the pointer 52a to be deflected more or less in accordance with the selected shutter speed.

Coaxially with the exposure meter 52, but independently therefrom and pivotally mounted in the follow-up pointer 60. It rises centrally from the spur gear 61 with which it is rigidly connected. The gear 61 is in mesh with the rack 62a which is part of the Z-shaped cam follower 62. The opposite end 62b of the cam follower is in contact with the cam 35a of the bellows apparatus and is acted upon by said cam in a manner to be described hereinafter. By this action the cam follower is moved in a direction parallel to the optical axis and guide means are provided to insure proper guidance in that direction as well as resilient means to insure constant abutment of the cam follower at the cam. The guide means and resilient means are not shown for sake of simplicity. The exposure member 52, together with its pointer 52a, is thus influenced by the selected shutter speed and the follow-up pointer 60 is influenced by the preselected f-stop value, both together representing a mechanism for semi-automatically establishing the correct shutter speed and f-stop value, which is well known in the art and which is achieved whenever the position of the pointer 52a coincides with the position of the follow-up pointer 60.

The base plate 1 of the bellows apparatus carries a rack 3 engaged by a pinion 6 rotatably mounted in the slider 4 of the objective standard 5. The pinion 6 is rigid on the shaft 7 which carries on its outer end a knurled knob 7a for shifting the slider on the base plate 1 in a known manner.

On the slider 4 is rigidly mounted the objective standard 5 which carries a bayonet mounting 9 on the side facing the objective. Between the objective standard 5 and the frame 10 which is integral with the base plate 1, the bellows 11 is extended.

The slider 4 has a shifter 12 slidably mounted on one side of it for movement parallel to the optical axis. The shifter 12 surrounds the shaft 7, and for this purpose the elongated hole 13 is provided. The handle 8, shown in FIGURES 2, 3 and 5, is provided as an actuating member for the shifter 12.

Figure 4:
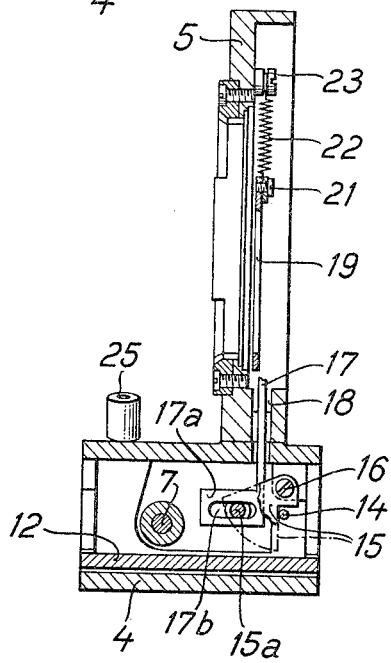
FIGURE 4 is a longitudinal section through the objective standard in the direction of the optic axis.
Figure 5:
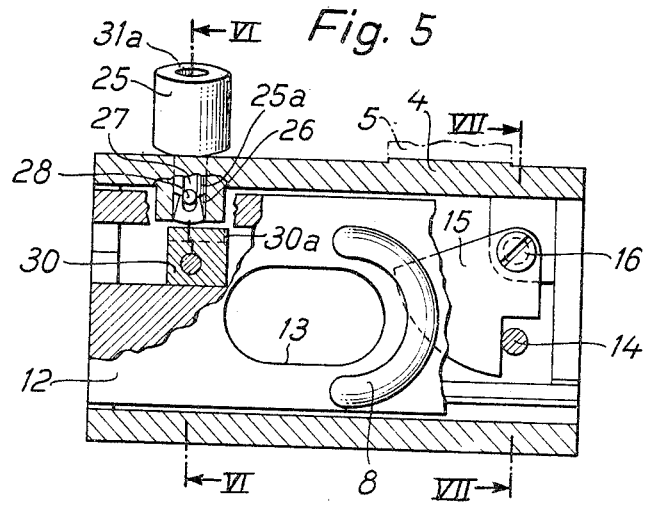
FIGURE 5 is a partial cross-section of the diaphragm actuator and locking mechanism on the line V—V of FIGURE 6.
Figure 7:
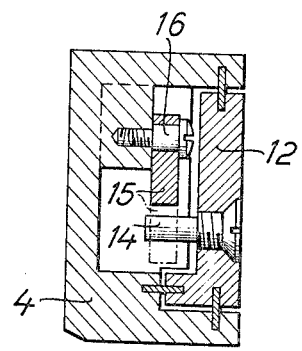
FIGURE 7 is a transverse section through FIGURE 5 on the line VII—VII.

On its inner surface the shifter 12, particularly shown in FIGURE 7, carries the stud 14 for tilting the single-arm segmental lever 15 which is pivotally mounted on the stationary screw 16, shown in FIGURE 5. On the inner side of the lever 15 is mounted a cam 15a which extends into an elongated hole 17b in the angular extension 17a at the lower end of the rod 17 of FIGURES 3 and 4. The latter extends upwardly through an opening 18 in the slider 4 and into the objective standard 5 where it is connected to one arm 19a of the two-arm lever 19.

Figure 3:
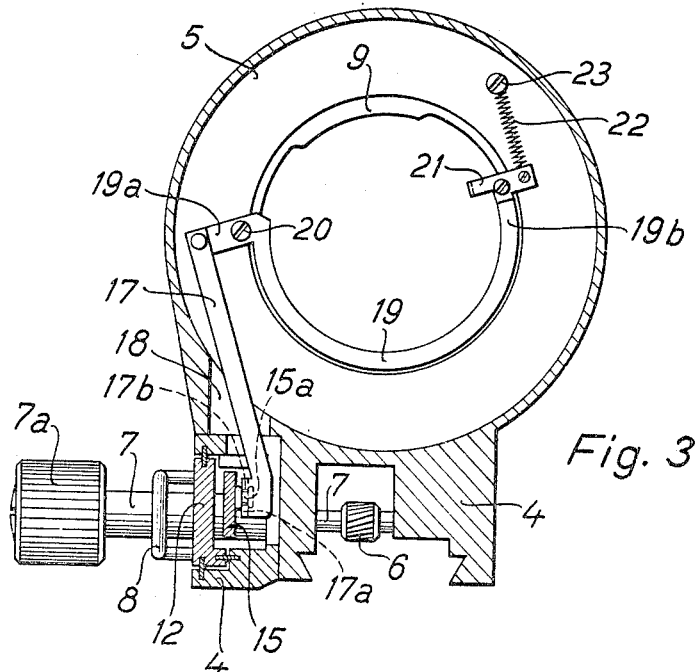
FIGURE 3 is a section through the objective standard, perpendicular to the optic axis of the bellows apparatus.

The lever 19 is pivotally mounted on a stationary pivot screw 20 close to the bayonet mounting 9 around which the second arm 19b of the lever 19 extends over an arc of about 200°, as shown in FIGURE 3. This end 19b of the lever has firmly screwed to it the diaphragm setter 21 which is acted upon by the tension spring 22 which has its opposite end connected to an anchor screw 23.

The movable diaphragm blade ring 72 is also provided with the arm 74 between which and the wall of the lens mounting 71 the spring 73 is suspended. The latter serves to turn the diaphragm to the preselected value, whenever the diaphragm setter 21 gives way. The arm 74 is also used to abut against the pin 75a which is rigidly secured to the diaphragm preselecting ring 75, which in known manner is set with its f-stop value marks 76 against the stationary index 77 by rotation and thus defines by its position how far the diaphragm blade ring 72 can be turned, i.e., how far the diaphragm is to be closed down.

Figure 6:
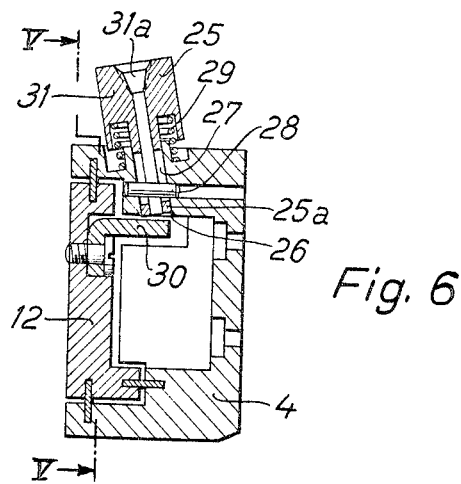
FIGURE 6 is a transverse section through FIGURE 5 on the line VI—VI.

For holding the slider 4 with the objective in the most advanced position in which the diaphragm setter 21 keeps the diaphragm in completely open position, the following locking mechanism is provided. In the slider 4 the pressure piece 25 is inserted, as shown in FIGURES 2, 5 and 6, which carries a central shank 25a extending through the bore 26 and into the slider 4. The shank 25a has an elongated hole 27 through it for receiving a transverse pin 28 driven into the slider. The pressure piece 25 is, therefore, shiftable in the direction of its longitudinal axis through a distance about equal to the length of the elongated hole 27. It is, however, kept in its outermost position by a compression spring 29 between the slider and the head of the pressure piece.

The pressure piece 25 operates in conjunction with the angular bracket 30 which is fastened by screws to the inner wall of the shifter 12, particularly shown in FIGURE 6. The edge 30a of the bracket which is directed away from the objective will be in front just beyond the extension 25a when the shifter 12 is moved as far as possible in the direction of the objective, as can be best visualized on FIGURE 5. If the pressure piece 25 is depressed while in position of the shifter 12, the extension 25a will be pushed behind the angle bracket 30, and if the shifter 12 is then released, the shank 25a will prevent rearward movement of the shifter. For more dependable operation, the edge 30a of the bracket and the lower extremity of the shank are formed slightly conical, as shown in FIGURE 5.

The pressure piece 25 with its shank 25a is also provided with a longitudinal bore 31 whose outer end 31a is threaded to receive a cable release. If a cable release is screwed in and actuated, the end of the cable will seat upon the transverse pin 28 and the cable jacket will draw the pressure member outwardly so as to release the angle bracket 30.

Figure 9:
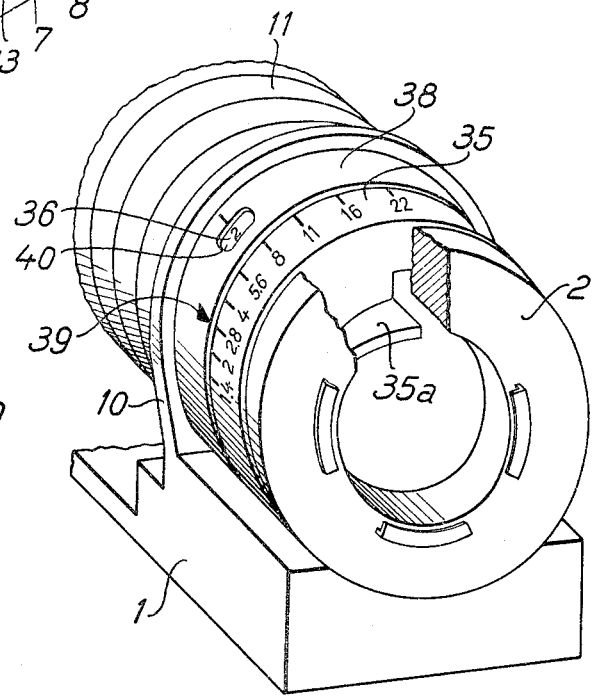
FIGURE 9 is a perspective rear view of the bayonet mounting for attaching the bellows apparatus to the camera.

The side of the bellows apparatus which is adjacent the camera body 50 carries immediately in front of the bayonet mounting 2 the simulating mechanism for the follow-up pointer 60 in the camera body. This simulating mechanism consists essentially of the ring-shaped diaphragm number carrier 35 with which the cam 35a of FIGURE 9 is rigidly connected.

Since the bellows apparatus is intended for use with interchangeable objectives with different initial aperture sizes, and also for use with a camera in which the light intensity is measured through the picture taking lens, it is not sufficient merely to set the diaphragm number carrier 35 relative to a stationary index. By changing the initial opening the amount of light transmitted to the photoelectric resistor 57 will also be changed, so that a correct adjustment of the shutter time and $f$-stop value will be obtained only when in every picture taking objective the extreme increase of the cam, assumed here to be the smallest increase, corresponds to the initial objective opening. This necessitates a special adjusting index for each objective. This requirement can be satisfied most readily in an embodiment of the invention, as shown in FIGURE 8b.

Here the scale 36 which is fastened to the rear frame 10 of the bellows apparatus carries diaphragm numbers $f:1.4$ and $f:5.6$, corresponding to the initial openings of the objectives that are to be used on the apparatus. Adjacent thereto is movably mounted the diaphragm number carrier 35 with its cam 35a which is engaged under spring pressure by the cam follower. During the adjustment of this diaphragm number carrier the user must keep steadily in mind which initial opening the objective has that was last inserted, and he must then adjust and read off the diaphragm numbers of the movable number carrier 35 in relation to the corresponding diaphragm number of the fixed scale 36. The stationary abutment 37 prevents him from adjusting the diaphragm number carrier to an $f$-stop value which is larger than the initial opening of the objective presently in use.

A further embodiment of the invention is shown in FIGURE 8a, and is an improvement over the embodiment described above.

It consists of a fixed diaphragm number scale 36 with the numbers of the $f$-stop values $f:1.4$ to $f:5.6$ which are covered by the movable index carrier 38. The latter carries an index 39, relative to which the movable diaphragm number carrier 35 with its cam 35a is adjustable, and which also has the aperture 40 through which only one $f$-stop value number of the fixed scale 36 is visible at one time. This arrangement is such that when the cam follower 62b is on the lowest part of the cam, the index 39 will point to that number on the movable diaphragm number carrier 35 which corresponds to the number on the fixed scale 36 which is visible through the aperture 40. If local conditions make it necessary for the relative positions of index 39 and aperture 40 to be changed, then it will also be necessary to make a corresponding adjustment between the fixed scale 36 and the movable diaphragm number carrier 35.

Here there is also present the stationary abutment 37 for limiting the movement of the movable diaphragm number carrier 35 in the direction of the arrow A, so that it will never be possible to adjust to a diaphragm number which is not included in the diaphragm range of the corresponding objective.

In order to limit the adjustment of the movable diaphragm number carrier 35 in the direction of the arrow B of FIGURE 8a, a stop 41a is connected to and shiftable with the index carrier 38, the stop 41a being in the path of the end surface 35b of the cam 35a and is part of the stop carrier 41 which latter is ring-shaped but is shown flattened out in FIGURE 8a and is shiftable relative to the index carrier in the direction of the optical axis. For this purpose the stop carrier 41 with its rigidly supported pin 41b hangs in the elongated slot 38a of the index carrier 38 while being guided by its stepped longitudinal slot 41c on the stationary pin 42. In this form of the invention there is an addition to the stop 41a, also another stop 41d provided, these two stops being spaced from each other by a distance equal to the spacing between successive numbers on the diaphragm number carrier 35 and on the fixed scale 36. The provision of the two stops in conjunction with the axial adjustability of the stop carrier 41 and its stepped longitudinal slot 41c is to permit the use of different objectives with different numbers of diaphragm steps. The series of diaphragm numbers on which this embodiment of the invention is based, are shown in FIGURE 8c. These series show that with the objectives having initial openings $f:1.4$ and $f:2$, the smallest diaphragm opening is $f:16$, whereas with objectives having initial openings $f:2.8$ and $f:5.6$, the smallest opening is $f:22$.

It can now be readily understood from FIGURE 8a that if the index carrier 38 with its aperture 40 is set on diaphragm number $f:1.4$ of the stationary scale 36, the end surface 35b will engage the stop 41a when the diaphragm number $f:16$ on the movable number carrier 35 is adjacent the index 39 because the distance from diaphragm number $f:1.4$ to number $f:16$ is exactly as large as the distance from stop 41a to the end surface 35b.

There will be no change at this stop when the index carrier 38 is moved, for example to diaphragm number $f:2$ of the fixed scale 36, by movement in the direction of arrow C. The diaphragm number carrier 35 will also encounter the stop 41a upon being shifted in the direction of arrow B when the diaphragm number $f:16$ is positioned at index 39. The same would also occur when the index carrier is moved to the initial opening $f:2.8$. This would, however, be wrong because, as shown in FIGURE 8c, the objective with the initial opening $f:2.8$ has a smallest diaphragm opening $f:22$. The correct stop when diaphragm $f:22$ is selected can be obtained only by shifting the index carrier 38 with its aperture 40 and its index 39 through one diaphragm interval in the direction of arrow C, but with the stop remaining in the same place as with selected maximum opening $f:2$. For this reason the second stop 41d is provided, and the elongated slot 41c is formed with steps in such a manner that when the index carrier 38 is shifted from diaphragm number $f:2$ to number $f:2.8$ on the fixed scale 36, the stop carrier 41 will be shifted in the direction of the optical axis a distance equal to the height of the stop in the slot 41c. The second stop 41d, which is spaced to the left of FIGURE 8a from the first stop 41a by one diaphragm number interval, is thereby moved into the path of the end surface 35b so as to become effective as a stop. As far as the position of the stop is concerned, nothing has been changed by the transition from an objective with a maximum opening f:2 to one with f:2.8. It also results from this that the diaphragm number carrier 35 can be brought with its diaphragm number 22 adjacent the index 39 while the first stop 41a dips into the cut-out portion 35c of the diaphragm number carrier 35, shown in dotted lines in FIGURE 8a.

The functioning of the bellows apparatus in combination with the camera and a certain interchangeable objective, e.g., with the maximum relative opening f:2, is as follows: After the objective is attached, the diaphragm is brought to its maximum opening by pushing the handle 8 in the direction of the objective whereby the shifter 12 is moved to cause its stud 14 to tilt the pivoted segment 15 which in turn lifts the rod 17. Thereby the lever 19 of FIGURE 3 is swung in clockwise direction and with it the diaphragm setter 21.

Upon this the diaphragm of the lens has to be set to its widest open position which has to be accomplished by pivoting the diaphragm preselecting ring 75 in the direction of the arrow D. The pin 75a will thereby contact the lever 74 and pivot the movable diaphragm blade ring 72 in the same direction against the force exerted by spring 73. During the last phase of this pivoting movement the front portion of arm 70 abuts against the diaphragm setter 21 by which it is bent over. The arm 70 can thus bypass the setter 21 after which the front portion of arm 70 will snap back in its initial position under the influence of spring 70a. The diaphragm blade ring is now retained locked in its achieved position by the setter 21 even if the diaphragm perselecting ring be pivoted in a direction opposite to the one designated by arrow D.

With the diaphragm in its furthest open position, the pressure piece 25 is then depressed to bring the shank 25a behind the angular bracket 30 so that if the handle 8 is then released, the diaphragm will remain open. The user is now in a position to do the focusing at maximum brightness of the viewing screen by rotating the knurled knob 7a in the usual manner.

For determining the correct shutter speed and f-stop value, the index carrier 38 with its aperture 40 is first brought upon the diaphragm number 2 of the fixed scale 36. The adjusting range of the diaphragm number carrier 35 is thereby confined to the diaphragm numbers 2 to 16.

In accordance with the prevailing object brightness, a coincidence of pointer 52a and follow-up pointer 60 is now established by either setting the shutter speed setting dial 59 (which will influence the deflection of the pointer 52a) or by turning the diaphragm number carrier 35 (which via cam 35a, cam follower 62b and spur gear 61 will influence the position of the follow-up pointer) or by adjusting both these members in a manner known per se.

The cam 35a hereby serves as simulating cam with which the user can indeed influence the position of the follow-up pointer, but which has no reaction on the diaphragm preselecting ring 75 of the objective. The user after having completed this to define the correct shutter speed and f-stop value must then manually turn the diaphragm preselecting ring to the same f-stop value that is adjacent the index arrow 39. This is nevertheless an important advantage over the known devices because in this manner the user will be able to make use of the exposure measuring device which in the absence of such a simulating mechanism could not be made use of at all.

If the shutter speed setting dial and the diaphragm preselecting ring of the objective are set, then it is possible on the one hand by again pressing with the finger on the handle 8 in the direction of the objective to set free the shank 25a, thereby releasing the slide 4 and permitting the spring 22 to swing the lever 19 in counterclockwise direction so that the diaphragm of the objective can close to the predetermined value and the closure thereby be effected.

However, the user can also attach a double cable release, one of its wires being attached to the pressure piece 25 while its other wire is attached to shutter release. By pressing upon the wire release button the pressure piece 25 with its shank 25a is first pulled away from behind the angle bracket 30 so that the diaphragm is simultaneously closed thereby, and shutter operated immediately thereafter.

It will be understood that this invention is susceptible to modification in order to adapt it to different usages and conditions and, accordingly, it is desired to comprehend such modifications within this invention as may fall within the scope of the appended claims.

We claim:
1. In a single lens reflex camera having an exposure measuring device influenced by the shutter speed setting dial of the camera and by the diaphragm preselecting ring of the objective, said exposure measuring device comprising a photoelectric element, an objective guide structure attached to the camera, an objective standard slidably mounted on said guide structure, an objective lens interchangeably connected to said objective standard comprising a diaphragm preselecting ring, abutting means connected to said ring, a movable diaphragm blade ring, spring means adapted to urge said diaphragm blade ring in the direction of the smallest aperture, means rigidly connected to said diaphragm blade ring adapted to interengage locking means within said objective standard whereby said diaphragm blade ring is retained in the position of the greatest diaphragm aperture, said locking means comprising a shifter slidably mounted to one side of the objective standard slider, having means for tilting a lever within said objective standard, a diaphragm setter fixed rigidly to said lever, and tensioning means for retaining said diaphragm setter in a position whereby said diaphragm blade rings are locked, a movable pressure piece inserted in said slider adapted to hold said shifter in its foremost position, means to withdraw said pressure piece from its holding position, means connected to said movable diaphragm blade ring and adapted to cooperate with said locking means, mounting means adapted to attach said objective guide structure to the camera body, and means on said objective guide structure adapted to influence said exposure measuring device in said camera body.

2. In the single lens reflex camera according to claim 1, said means adapted to influence said exposure measuring device further comprising a stationary abutment against which the diaphragm number carrier abuts in its position corresponding to the largest diaphragm aperture of a given objective lens, a stop carrier being attached to said movable index carrier and having a stop against which said diaphragm number carrier abuts if the smallest diaphragm number is set opposite to the index of the index carrier.

3. In the single lens reflex camera according to claim 2, said stop carrier movably connected to said index carrier and having two stops, the latter spaced from each other by a distance equal to the distance of two adjacent f-stop value marks, means adapted to automatically move the stop carrier relative to the index carrier by the distance of said two adjacent f-stop value marks if the index carrier is set with its aperture over a reference index on the fixed scale beyond a pre-established value.

4. In the single lens reflex camera according to claim 1, the means for tilting said lever comprising a single arm lever pivotally connected in said slider, means on said shifter for tilting said single arm lever, and means on said single arm lever for movably linking the latter to said first lever.

5. In the single lens reflex camera according to claim 1, said means adapted to influence said exposure measuring device further comprising a movable index carrier overlapping said fixed scale and having one index and one aperture, said index and said aperture being spaced from each other whereby the same reference index is visible through the aperture when the diaphragm number carrier with the initial f-stop value mark of a given objective is set opposite to the index of the index carrier, said diaphragm carrier being movable relative to said index carrier, said diaphragm number carrier being rigidly connected to a cam, the latter extending in the direction of the camera body and actuating a cam follower therein, said cam follower transmitting the motion of said cam to said exposure measuring device.

References Cited

UNITED STATES PATENTS 3,143,945   8/1964   Ludwig.

FOREIGN PATENTS 1,145,479   3/1963   Germany.

JOHN M. HORAN, Primary Examiner

U.S. Cl. X.R.

95—10, 45